N. Scholfield,
Governor.

N° 17,847.    Patented July 21, 1857.

2 Sheets—Sheet 1.

N. Scholfield,
Governor.

2 Sheets—Sheet 2.

Nº 17,847.

Patented July 21, 1857.

UNITED STATES PATENT OFFICE.

N. SCHOLFIELD, OF NORWICH, CONNECTICUT.

GOVERNOR FOR WATER, STEAM, AND OTHER POWER.

Specification of Letters Patent No. 17,847, dated July 21, 1857.

*To all whom it may concern:*

Be it known that I, NATHAN SCHOLFIELD, of Norwich, in the county of New London and State of Connecticut, have invented a new and useful Improvement in the Art of Equalizing or Governing the Motion of Water-Wheels, Steam-Engines, &c., and that the following is a full and exact description thereof, reference being had to the accompanying drawings, making part of this specification.

My improvement consists in so changing the medium of the action of a governor or regulator on the supply of the motive power, when in action to rectify a disturbed motion, as, that its action shall cease while approaching to, and before its proper speed is fully restored, whenever its tendency thereto is rapid; and that in such case, it shall react, or commence a reverse action, on the supply, even before reaching the proper point, if its return thereto is so rapid as to cause a tendency to pass this point, but if its return is slow I allow its normal action to continue till its proper speed is attained; by which means I am enabled so to apply the governor as to act much more rapidly on the gate of a water wheel during the first moments of any variation, or on that which dispenses the supply of the motive power in any case, than without this improved method, and thus prevent in a great degree, the extremes of variation in speed, as well as to correct more rapidly any disturbed action.

Figure 1:
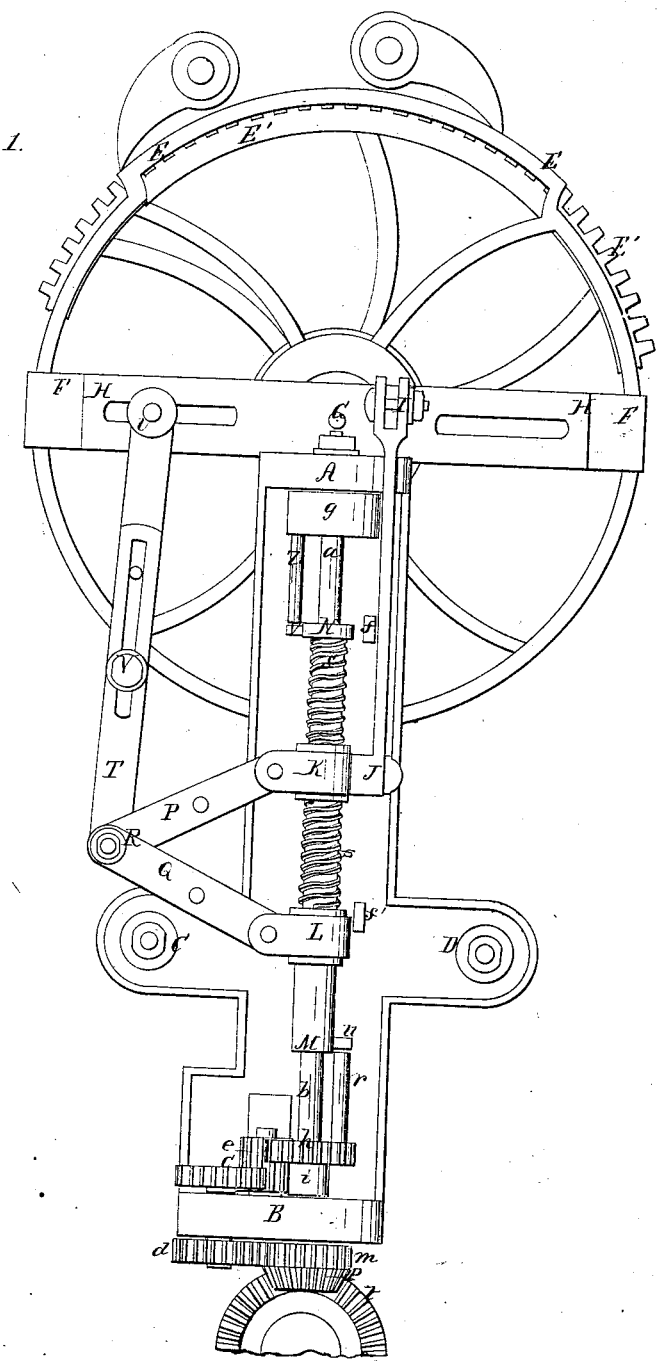
Figure 1:
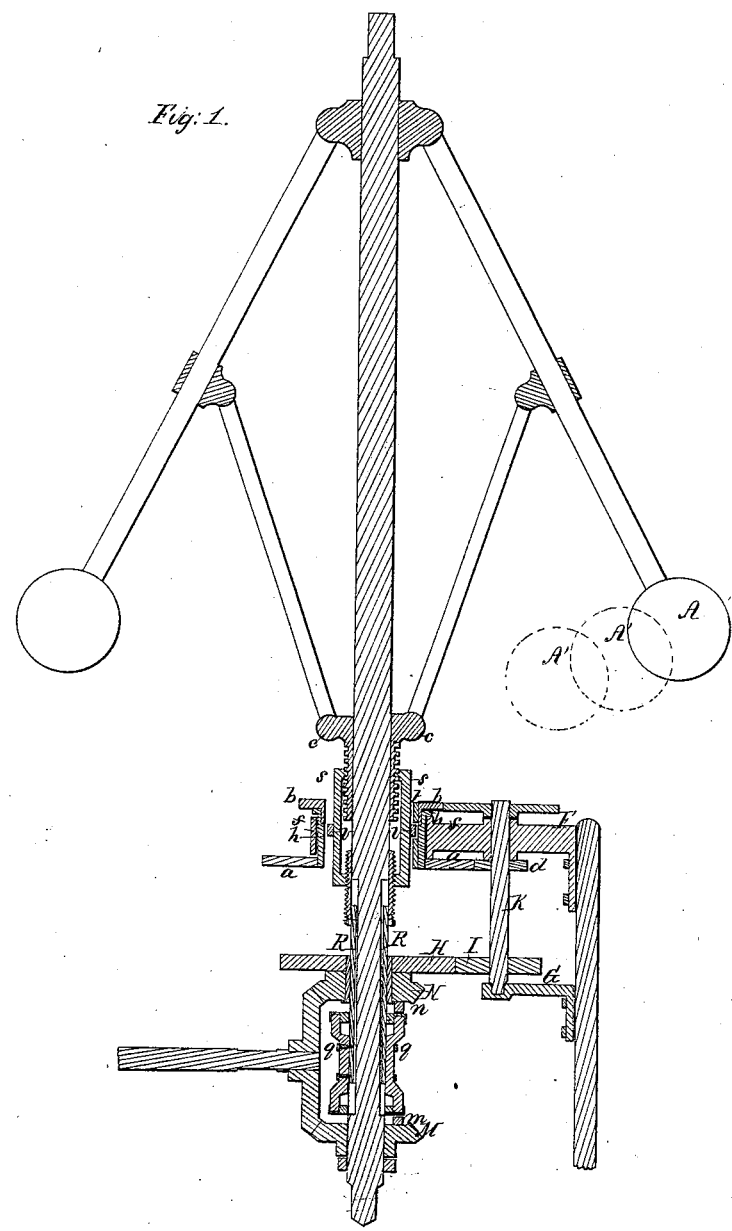

Figure 1 represents a sectional view of a governor with a sliding clutch $q\ q$ to act on the reversing gears M N through the dogs or studs $m\ n$. On the sliding collar C of the governor is screwed loosely a thimble S; this thimble is also screwed on, and holds another collar $e$, fitted to slide loosely on the shaft of the governor. Both the collars C and $e$ turn with the shaft at all times, but may slide freely thereon up or down. The screw of the collar $e$, is much finer than that of C, but screws in the same direction, and as the thimble or duplex nut S, may be made to revolve thereon in either direction, they serve as a differential screw to change the relative position of the collar $e$, compared with that of C, and hence to lengthen or shorten the connection between C, and $q$, since the collar $e$, is connected by rods R, R, sliding in grooves in the shaft to the sliding clutch $q\ q$, so that whatever vertical movement is given to $e$, is also imparted to $q$.

$k$ is a shaft supported by studs F and G, and is driven by gears H, I.

In the socket $ff$ of the stud F and concentric with the thimble S, is a thimble $h\ h$, revolving with a motion somewhat slower than that of the governor, but in the same direction and driven by gears $a, d$. And also concentric with the thimble S, is a wheel $b$, revolving with a velocity greater than that of the governor; this latter by the projection of its hub revolves within a socket in the upper end of the revolving thimble $h\ h$, and is driven by the gear wheel $g$.

Within the revolving thimble $h$, and hub of the wheel $b$, are fitted studs or dogs $t$, with an intervening space between them corresponding to the width of a similar dog or stud V, on the outer surface of the thimble S, so that whenever the said thimble is in a medium position as shown in the drawing, it may revolve with the shaft of the governor, without being retarded or accelerated by the stud V, locking in with, and moving with either of the studs $t$. But if the thimble S is depressed by reducing the speed of the governor, so that the stud V thereon, locks in with the stud $t$, of the thimble $h$, the thimble S will be retarded in its motion relative to that of the governor, and will move only with the proper velocity of $h$, which being supposed less than that of the governor or collar C, it will screw thereon; and the direction of the screw in such case should be such as to screw the thimble upward to regain its medium position. And if, in like manner, the thimble S is elevated above a medium position, by an increased velocity of the governor, the stud V thereon would lock in with the upper stud $t$, of the gear $b$, and would be carried by it with a greater velocity than that of C, and would be screwed downward thereon. So that in whatever position the collar C, or the balls of the governor may stand, or whatever may be the speed of the governor at any time, the thimble S will always come, ultimately to the medium position as shown. But not so with the screwed collar $e$ and sliding clutch $q$, for since any change in position of the sliding collar C, by the expansion or contraction of the governor, although in the first instant is communicated to the collar $e$, yet by the compensating adjustment of the differential screw which acts in a greater degree or traverses faster on C, than on $e$ the relative positions of these two collars are changed as well in reference to each other, as to the thimble S; so that while the thimble after having its position changed by the normal action of the governor returns to its original position by the compensating adjustment of the differential screw the collar e and clutch q return in part only. Therefore (having the work so adjusted that when the balls of the governor stand in a given position A the stud V shall revolve between the studs t, without contact; and so that the clutch q shall revolve between the dogs m, n, also without contact therewith) if the speed is reduced so that the ball A of the governor falls to the position A'', and so that the stud V in the first instance falls below its medium position, and locks in with the stud t, of the revolving thimble h, the clutch q will also lock in with the dog m, carrying with it the wheel M, through which the supply of motive power is increased; and the thimble S soon returns to its normal position by screwing upward on C, where it remains, while the position of the governor is unchanged; and the stud V, revolves between the two studs t. But the clutch q by the action of the differential screw will have returned through only part of the distance moved by the normal action of the governor; and hence will still continue its action on the stud m, so long as the balls of the governor remain in the position A''. But since the connection between the clutch q, and sliding collar C, has been contracted by the action of the differential screw, while the balls are in position A'', it is manifest that the clutch will be disengaged from the stud m, sometime before the ball reaches its proper position A, by an increase of speed; and if the difference in draft of the screws on C and e is one half, or if the screw on e, is one half as coarse as that on C, then for any specific movement having been communicated to C and e, by the direct action of the governor, e and q will have been returned through one half that distance, by the action of the differential screw; and hence by the return of the balls to the position A', which is at half the distance between its proper position A, and extreme position A'', the clutch q will be disengaged from the stud m, and if the ball approaches nearer than this to the position A, the clutch q will even lock in with the stud n, and act in a reverse order to check the supply of motive power, even before reaching the position A, or before the proper speed is attained. But in this case, the stud V, of the thimble S, will have locked in with the upper stud t, by which a reversing action will be had on the differential screw, lengthening the connection between C and q, and the clutch q, will soon become disengaged from n.

We have in the preceding, supposed the speed to increase, or the position of the balls on the governor to become changed somewhat suddenly, as from the position from A'' to A' and thence to A, in which case the clutch q was supposed to become neutral, or disengaged, when the balls had come in position A' and to act inversely after passing this point toward A; but if the return of the speed from any extreme of variation is gradual, or if the change of the position of the balls from A'' to A' and A is gradual, the action of the clutch q on the dog m, may continue even till reaching the position A, or till the proper speed is restored; for as soon as the ball leaves the position A'', the differential screw is set in motion by the stud t, of the wheel b, increasing the connection from C to q; and unless the direct action of the governor thereon by its expansion, is much more rapid than the compensating adjustment by the differential screw, the normal action of the clutch q, on the stud m, will continue till the ball comes in position A, and till the proper speed is fully restored.

The action when above the proper speed, is of the same character as when below, but in an inverted order. And in all cases while the speed is increasing the tendency of the compensating adjustment by the differential screw is to lengthen the connection between the collar C, and clutch q, but while the speed is decreasing the tendency is to shorten this connection.

Another mode of construction by which the same object is accomplished is shown at Fig. 2, which represents the plan used by me on my ratchet regulator and is shown in full medium size.

A, B, C, D, is a stock or frame of cast-iron; A and B are ledges or raisements of about 1½ inches to receive and support the journals of the shaft a, b, and the stud gears c, d, e. In its application, I bolt this stock to one of the stands supporting the ratchet wheel shaft of the regulator by bolts C and D.

E is a shield or guard as used in that regulator to protect the teeth of the ratchet from the action of the pawls, except when carried to the right or left by the action of the governor to allow their action therein to rectify a disturbed motion.

M, N, is a thimble or pipe sliding and revolving freely on a rod or shaft a b, and having a screw S, on which traverses a nut K. A collar L clasps the thimble loosely allowing it to revolve therein but holding its position longitudinally thereon. The collar and nut are connected by the jointed links P Q.

The nut K, communicates by an arm or rod J, L, to a lever, from a sliding collar of a common governor at a joint I. The joint R, of the links P Q, is connected by an arm T to a plate H, attached to the shield E, by a joint U. This connection may be varied and adjusted in length, by the sliding clasp and screw V. With this arrangement any action by the expansion or contraction of the governor, acting directly on the nut J, to change its position vertically, is conveyed also to the thimble M, N; and the connecting arm T, by its connection at R, with the jointed links P Q; and hence also to the shield or guard which is moved in the same manner and degree, as if the connection thereto from the governor was direct, and without the intervention of the several devices herein described. But on the lower end of the shaft $a$, $b$, is a wheel $h$, which revolves loosely on the shaft in one direction while the shaft revolves in the opposite direction, carrying with it a wheel $g$ at the upper end.

In the wheel $h$, is a stud pin $r$, and in $g$, a similar stud pin $z$, while corresponding studs $u$ and $v$ at the lower and upper ends of the thimble M N, are so placed, that when the governor holds the thimble in its medium position as shown, the wheels $h$, and $g$, with their studs $r$ and $z$, may revolve freely, without locking in with either of the studs $u$ or $v$. But whenever the position of the thimble is raised by the action of the governor, the stud $z$ comes in contact with $v$, causing the screw to revolve and to traverse in the nut which is held in position by the governor. The direction of the motion should be such as to cause its traverse to be from its connection with the stud $z$, or to cause the thimble to return to its neutral or medium position. The same occurs but in a reverse order, when the thimble is carried below. Hence it will be seen that whatever may be the variation in speed as indicated by the governor, or in whatever vertical position the nut K may be held, the thimble M N, and collar L, will always ultimately be returned to the neutral, or medium position as shown; and since the joint R, of the equal links P, Q, partakes equally of the vertical movements of K and L, it follows that its position will always be found at a medium between them; and that whatever direct action is transmitted thereto from the governor, one-half of this motion is soon returned by the compensating adjustment of the screw. Hence the result is similar to the action of the differential screw in the former case; and in the return of the speed from any extreme, the action of this regulator will decrease, and will become neutral before arriving at the proper speed, and if its return is rapid, or if the changing position of the thimble by the action of the governor is more rapid than the action of the compensating adjustment thereon, the regulator will commence a reversing action on the supply of motive power, even before reaching the proper speed, and hence will anticipate or counteract any tendency induced by its own action, to carry the change of speed too far or to pass the medium. The shield or guard may be made to partake more or less of the action of the compensating adjustment, by connecting the arm T, at W, or H, in the center of the links P, or Q, instead of at R, for if connected at W, it would partake of the motion of K, in a greater degree than of L; but if connected at H, it would partake in a greater degree of the motion of L.

Instead of applying these compensating adjustments directly to the acting or dispensating part of a governor or regulator, it may be applied so as to vary the relative speed of another dispensating governor, which acts on the supply of motive power, either by controlling the position of a belt on cone pulleys driving such dispensating governors, or by acting in any other manner on such dispensating governor so as to control its normal or medium rate of action.

One essential feature to be observed in the construction and action of this compensating adjustment is that the time required in passing through its whole limit for any variation in speed, shall be equal to, or greater than that required for the proper change in motive power, to overcome the inertia, or other retarding causes of action. This will differ in different wheels and in different kinds of machinery, and can be varied by varying the speed of the adjusting action.

A variety of other modes of construction and application may be adopted but those here described are deemed a sufficient exemplification of the principle contemplated.

Having thus described my invention, and what I deem the best modes of carrying it into effect, what I claim as my invention, and for which I solicit Letters Patent, is—

The application of a compensating adjustment, for so changing the normal or medium rate of action of a governor, or regulator, while in action, to rectify a disturbed motion, that it shall cease to act on the supply of the motive power while the speed of the wheel or machinery is returning from any extreme of variation, and before reaching its proper rate, or that in which its action commenced; and also that it may commence a reverse action thereon to counteract, or anticipate any excess thereof, if the return of the speed is so rapid as to induce a tendency to pass its proper medium.

NATHAN SCHOLFIELD.

Witnesses:
H. M. SCHOLFIELD,
JOHN BARNES.